(12) United States Patent
Farias et al.

(10) Patent No.: US 11,126,956 B2
(45) Date of Patent: Sep. 21, 2021

(54) ORDER FULFILLMENT

(71) Applicant: Nike, Inc., Beaverton, OR (US)

(72) Inventors: Vivek Farias, Newton, MA (US);
Aryan Iden Khojandi, Cambridge, MA (US); Ritesh Madan, Berkeley, CA (US); Chad Yan, Boston, MA (US); Guang Yang, East Boston, MA (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/980,351

(22) Filed: May 15, 2018

(65) Prior Publication Data
US 2019/0354920 A1 Nov. 21, 2019

(51) Int. Cl.
*G06Q 10/08* (2012.01)
(52) U.S. Cl.
CPC .................... *G06Q 10/087* (2013.01)
(58) Field of Classification Search
None
See application file for complete search history.

(56) References Cited

U.S. PATENT DOCUMENTS

| | | | |
|---|---|---|---|
| 7,543,743 B1 | 6/2009 | Yu et al. | |
| 7,607,577 B1 | 10/2009 | Yu et al. | |
| 8,352,382 B1 | 1/2013 | Katta et al. | |
| 8,825,798 B1 | 9/2014 | Johnson et al. | |
| 9,213,953 B1 | 12/2015 | Kassman et al. | |
| 2003/0046173 A1* | 3/2003 | Benjier | G06Q 30/0641 705/26.8 |
| 2005/0197913 A1* | 9/2005 | Grendel | G06Q 30/0635 705/26.82 |
| 2006/0015415 A1* | 1/2006 | Najmi | G06Q 10/087 705/28 |
| 2011/0238461 A1* | 9/2011 | Mulukutla | G06Q 10/04 705/7.31 |
| 2021/0142267 A1 | 5/2021 | Farias et al. | |

* cited by examiner

*Primary Examiner* — Paul Danneman
(74) *Attorney, Agent, or Firm* — Schwegman Lundberg & Woessner, P.A.

(57) ABSTRACT

Systems and methods for the automated fulfillment of orders from a fulfillment network including consumer-facing retail locations. Orders are partitioned into suborders, which are in turn assigned to retail locations based on forecasted demand for the suborder items at the retail locations. The assignment process considers operational data for each retail location such as the number of employees, the inventory of suborder items, shipping rate cards, return policies, business hours, pick decline estimations, etc.

18 Claims, 3 Drawing Sheets

ORDER FULFILLMENT

TECHNICAL FIELD

This invention generally relates to systems and methods for automatically fulfilling orders for goods and, more particularly but not exclusively, to systems and methods for fulfilling goods orders using a fulfillment network that includes a plurality of customer-facing retail locations.

BACKGROUND

Many retailers offer merchandise for sale both through physical stores and via the Internet. These retailers often fulfill orders for merchandise received via the Internet using an infrastructure that is dedicated exclusively to Internet-order fulfillment, including separate sources of inventory, dedicated delivery mechanisms, etc., while maintaining a separate infrastructure for supplying merchandise to physical stores.

These infrastructures are often overlapping and duplicative, requiring retailers to have sufficient inventory on hand to satisfy both store orders and Internet orders. However, attempting to service both sources of customer demand using a single infrastructure often results in lost sales, inventory exhaustion, etc.

A need exists, therefore, for methods and systems for servicing both store orders and Internet orders that avoid these failings.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments of the present invention offer methods and systems to fulfill online orders using a mixture of in-network retail locations and fulfillment centers, subject to various restrictions associated with each retail location. This allows for the optimization of the fulfillment process in a holistic manner that does not, e.g., rely on a rules-based approach, even when the order flow is fulfilled solely using fulfillment centers and not using retail locations.

In one aspect, embodiments relate to a system for fulfilling orders from a fulfillment network having a plurality of consumer-facing retail locations. The system includes at least one computer configured to retrieve, from a data source, operational data concerning a plurality of retail locations in the fulfillment network; receive an order comprising at least one item for delivery to an address; partition the order into at least one suborder comprising at least one item; forecast the demand for the at least one suborder item for a plurality of retail locations in the fulfillment network; select, for each suborder, a retail location in the fulfillment network for fulfilling the suborder based at least in part on the operation data and the forecasted demand; and transmit each suborder to the selected retail location for fulfillment. The operational data is at least one of the number of employees at the retail location, the inventory of the at least one suborder item present at the retail location, the shipping rate cards of the retail location, the return policies of the retail locations, the business hours of the retail location, and pick decline estimation for the retail location.

In some embodiments, the system further includes a data source having the operational data concerning a plurality of retail locations in the fulfillment network.

In some embodiments, the at least one computer is further configured to calculate at least one delivery factor based on the address and at least one of the retail locations and selecting, for each suborder, a retail location for fulfilling the suborder is also based in part on the at least one delivery factor, wherein the at least one delivery factor is selected from the group consisting of delivery time and delivery cost. In some embodiments, the selection of the retail location based on the forecasted demand weighs the forecasted demand for the at least one suborder item at the selected retail location against the weight of the operational data or the at least one delivery factor.

In some embodiments, forecasting the demand for the at least one suborder item for a plurality of retail locations includes retrieving historical demand data for the at least one suborder item for a retail location selected from the plurality of retail locations; computing an average of the retrieved historical demand data; and using the average as a forecast of the demand for the at least one suborder item for the selected retail location. In some embodiments, the system further includes a data store containing historical demand data for the plurality of retail locations, the historical demand data selected from the group consisting of purchase data inventory data, and web browsing transactions.

In some embodiments, the at least one computer is further configured to specify the shipment method in connection with the transmission of the suborder to the selected retail location.

In some embodiments, the at least one computer is further configured to receive instructions from an operator prioritizing at least one factor and selecting, for each suborder, a retail location for fulfilling the suborder is also based at least in part on the at least one priority factor, and the at least one priority factor is selected from the group of forecasted in-store demand, delivery time, delivery cost, the number of suborders, and pick decline.

In some embodiments, the pick decline estimation for a retail location is derived from historical pick decline data for that location.

In some embodiments, the at least one computer is further configured to eliminate at least some of the retail locations from the plurality of retail locations based on the ability of the retail location to meet a specified criterion prior to selecting a retail location for fulfilling the suborder.

In another aspect, embodiments of the present invention relate to a method of fulfilling orders from a fulfillment network comprising a plurality of consumer-facing retail locations. The method includes retrieving, from a data source by at least one computer, operational data concerning a plurality of retail locations in the fulfillment network; receiving, at the at least one computer, an order comprising at least one item for delivery to an address; partitioning, by the at least one computer, the order into at least one suborder comprising at least one item; forecasting, by the at least one computer, the demand for the at least one suborder item for a plurality of retail locations in the fulfillment network; selecting, for each suborder by the at least one computer, a retail location in the fulfillment for fulfilling the suborder based at least in part on the operational data and the forecasted demand; and transmitting, by the at least one computer, each suborder to the selected retail location for fulfillment. The operational data is at least one of the number of employees at the retail location, the inventory of the at least one suborder item present at the retail location, the shipping rate cards of the retail location, the return policies of the retail location, the business hours of the retail location, and pick decline estimation for the retail location.

In some embodiments, the method includes calculating, by the at least one computer, at least one delivery factor based on the address and at least one of the retail locations and selecting, for each suborder, a retail location for fulfilling the suborder is also based in part on the at least one delivery factor, and the at least one delivery factor is selected from the group consisting of delivery time and delivery cost. In some embodiments, the selection of the retail location based on the forecasted demand weighs the forecasted demand for the at least one suborder item at the selected retail location against the weight of the operational data or the at least one delivery factor.

In some embodiments, forecasting the demand for the at least one suborder item for a plurality of retail locations includes retrieving, by the at least one computer, historical demand data for the at least one suborder item for a retail location selected from the plurality of retail locations; computing, by the at least one computer, an average of the retrieved historical demand data; and using, by the at least one computer, the average as a forecast of the demand for the at least one suborder item for the selected retail location. In some embodiments, the historical demand data is at least one of purchase data, inventory data, and web browsing transactions.

In some embodiments, the method further includes specifying, by the at least one computer, the shipment method in connection with the transmission of the suborder to the selected retail location.

In some embodiments, the method further includes receiving, by the at least one computer, instructions from an operation prioritizing at least one factor and selecting, for each suborder, a retail location for fulfilling the suborder is also based at least in part of the at least one priority factor, and the at least one priority factor is selected from the group of forecasted in-store demand, delivery time, delivery cost, the number of suborders, and pick decline.

In some embodiments, the pick decline estimation for a retail location is derived from historical pick decline data for that location.

In some embodiments, the method further includes eliminating, by the at least one computer, at least some of the retail locations from the plurality of retail locations based on the ability of the retail location to meet a specified criterion prior to selecting a retail location for fulfilling the suborder.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
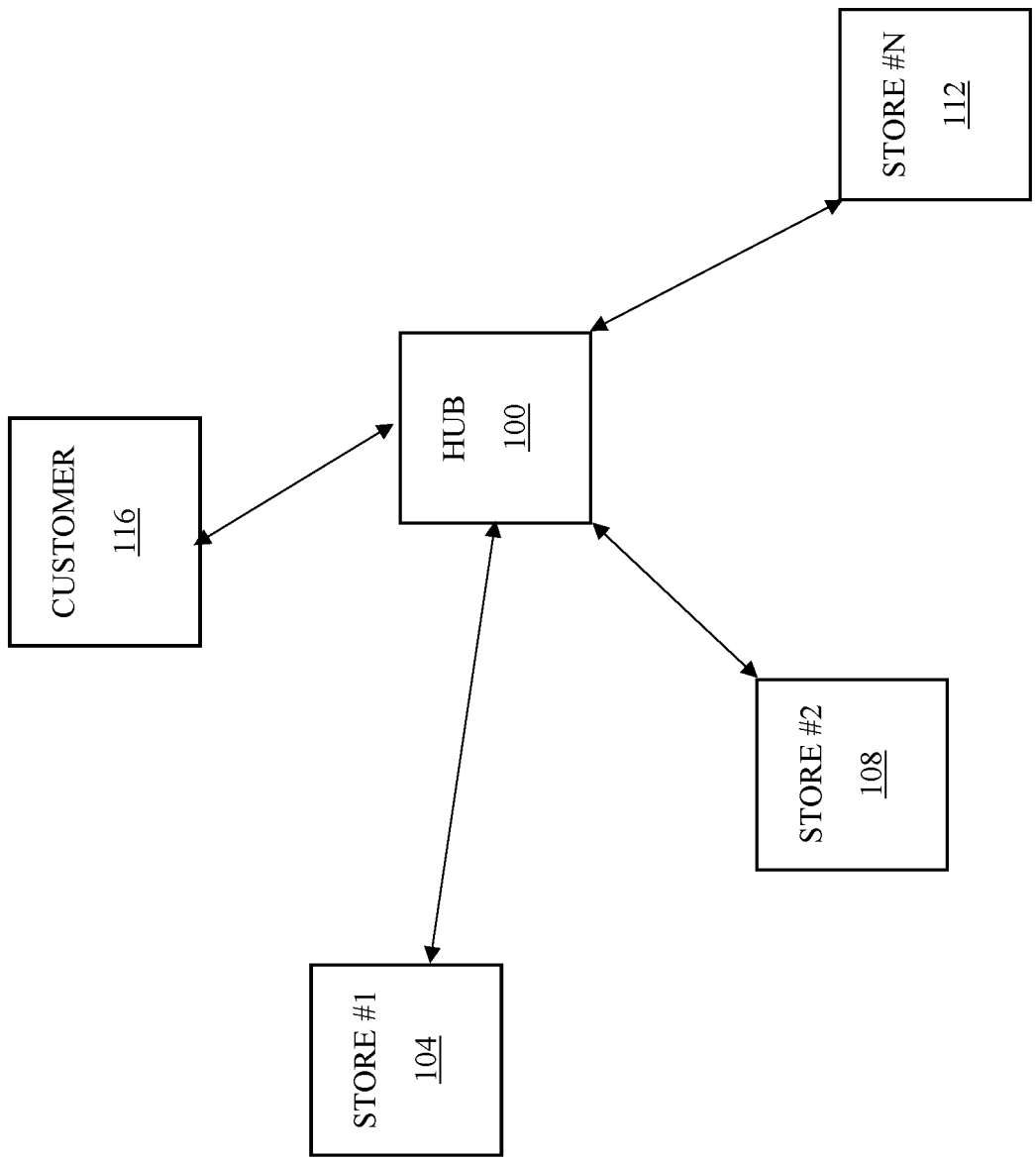
FIG. 1 illustrates a sample fulfillment network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Many retailers sell merchandise through physical stores and through online orders. Ideally, these retailers would fulfill the online orders using the inventory, shipping facilities, etc., associated with their physical stores instead of maintaining a separate infrastructure for fulfilling online orders. However, this goal is non-trivial as simple fulfillment schemes (e.g., such as fulfilling an online order from the inventory of the nearest physical store) may result in inventory exhaustion, staffing shortages, etc., that can ultimately result in lost sales and lower profits.

Additionally, such simple strategies may even result in aggregate worse performance (compared to embodiments of the present invention) on shipping cost, delay, etc. (i.e., factors explicitly considered by such approaches) because embodiments of the invention use the limited resources of store capacity and inventory more intelligently.

Accordingly, embodiments of the present invention offer methods and systems that collect data from one or more retail locations in a retailer's network and process online orders to determine which locations in the network should fulfill the online order, subject to various restrictions associated with each retail location. These restrictions can include location staffing, item inventory, shipping rate cards (including shipping cost and delay), return policies, business hours, and pick decline estimation, among others.

Notably, embodiments of the present invention may determine that a received online order should be partitioned into one or more suborders, each suborder consisting of at least one item from the original order, before determining the retail locations that should be assigned to fulfill each suborder.

FIG. 1 presents a sample fulfillment network in accord with the present invention for illustrative purposes. The network includes a hub 100 in communication with a plurality of retail locations 104-112 and at least one customer 116. One of ordinary skill will recognize that this figure is necessarily simplified for discussion purposes and that the scope of the invention will necessarily reach other variants and embodiments.

For example, hub 100 may or may not be a single computer or a plurality of computing units operating in parallel to provide the order processing features of the invention. Hub 100 may consist of physical computers or it may be implemented using a cloud computing service such as AMAZON WEB SERVICES offered by AMAZON, INC. of Seattle, Wash. or GOOGLE COMPUTE ENGINE offered by GOOGLE LLC of Mountain View, Calif.

Stores 104-12 in the illustrated embodiment are physical retail locations that are typically dispersed over a broad geographic area, although one or more stores may be located in proximity to each other. Other embodiments of the invention may use, e.g., dedicated fulfillment centers for order and suborder fulfillment in lieu of or in addition to retail locations.

FIG. 1 presents the hub 100, stores 104-12, and customer 116 as being directly interconnected for data and order exchange as discussed below. That said, one of ordinary skill will recognize that in various embodiments the hub 100 and stores 104-12 may be directly or indirectly connected, with the hub 100 retrieving data concerning one or more stores 104-12 from data repositories (not shown) that may themselves be directly or indirectly connected to stores 104-12. In particular, embodiments of the present invention collect data not present in the order fulfillment system, such as data present in a business intelligence (BI) system (e.g., user browsing history) and other outside data sources.

In normal operation hub 100 communicates with stores 104-12, receiving and transmitting information concerning inventory that each store has on hand, daily sales reports, staffing records (such as the number of employees at the store), shipping records and shipping rate cards (including shipping cost and delay), return policies, business hours, and other operational data for each store, such as pick decline estimation, i.e., an estimate of the likelihood that a request for an item will be declined despite the presence of the item in inventory due to, e.g., the unavailability of a worker to complete the request in the desired timeframe. The information can be exchanged on a scheduled basis, ad hoc, as needed, or some combination of the foregoing.

A customer 116 places an order for various goods with a retailer, typically including an address and a deadline for delivery. The order may be submitted directly to the hub 100 for processing, or it may be submitted online to another website, faxed to an order transcription and processing service, submitted by telephone, etc., before being delivered to the hub 100 for processing.

The order itself typically comprises a plurality of items. For illustrative purposes, this example assumes that the order includes four items, each of which can be found in one or more of store 104, store 108, and store 112. These assumptions are non-limiting in that, e.g., some items may be found in stores not shown in FIG. 1, all of the items may be found in a single store, etc.

The hub 100 decomposes the order into one or more suborders, with each suborder having at least one item. Having previously collected information from stores 104-12 concerning their inventory on hand, the hub can use this information to split the order into suborders, such that each store receives a suborder for the items that it has on hand in inventory. Sending a suborder containing an out-of-stock item to a store is counterproductive, and the hub 100 can use the inventory information that it has on hand to ensure that no suborder directed to a store contains an item that the store itself does not stock.

In certain embodiments of the invention, the hub 100 can use demand forecasting to better improve order splitting and suborder generation. By way of background, when stores 104-12 are retail locations, they will receive shoppers who will buy items and change the store's level of inventory. If the hub 100 had constant and instantaneous access to accurate inventory information for each store, then it could use this information in the suborder generation process.

However, in actuality, many factors preclude constant and instantaneous access to accurate inventory information for each store. For example, some stores may use separate sales and inventory systems that need to be reconciled at the end of the day. Some stores may only deliver information at set times throughout the day or the week. Local surges in demand may cause particular items to go out of stock before that information can be relayed to the hub 100.

Accordingly, embodiments of the present invention use, among other information, the collected historical data for items and stores to predict at the hub 100 the current item inventory in each store and to divide the order into suborders at the hub 100 using that information. The process of forecasting the demand for each item in each store and how that affects the store's inventory is discussed in U.S. patent application Ser. No. 15/844,613 ("the '613 application"), already filed on Dec. 17, 2017, the entire contents of which are hereby incorporated by reference.

Having forecasted demand information from the operational data on hand and used this information to forecast the current levels of item inventory in each store, the hub 100 selects for each suborder a retail location in the fulfillment network for fulfilling the suborder based on the operational data on hand as well as the forecasted demand for each item and transmits the suborder to the selected retail location for fulfillment. The suborder assignment process can be used to, e.g., balance inventory across stores to ensure that they have sufficient goods on hand to meet their expected demands after fulfilling the assigned suborders.

In one embodiment, the assignment process takes the form of a linear programming problem employing a primal-dual approach where the constraints include, e.g., individual store inventory, each store's capacity to ship goods, etc. The process begins by initializing all the decision variables to zero. For each incoming order, a store is selected and the primal and dual solutions are updated such that the primal solution is feasible, the dual solution is feasible (or nearly feasible), and the change in the dual solution is within a constant factor of change in the primal solution such that the final dual solution is within a constant factor of the final solution.

In various embodiments, the demand forecasting process may consider the entire day's set of orders and the effects of the fulfillment decisions made on the options available to fulfill future orders.

Having received a suborder, a retail location, like store 104, has its available employees assembles the items in the suborder from the inventory on hand and ships the completed suborder to the address in the original order in accord with the store 104's shipping rate card (including shipping cost and delay). Confirmation of completion and shipment can be supplied to the hub 100 by the store 104.

In the event that an error is experienced while servicing a suborder, e.g., because a requested item is not in inventory or because the suborder cannot be fulfilled within a desired timeframe, the system in the store 104 in communication with the hub 100 can send an appropriate error message.

The foregoing discussion assumes that each order is received and fulfilled, but embodiments of the present invention may also service orders in a batch mode, i.e., letting received orders accumulate and then servicing them at, e.g., scheduled or predetermined intervals. Batch mode can avoid a situation where immediately servicing one order would result in disadvantageous treatment of another order, by considering the effect of each order's servicing on the other order.

Figure 2:
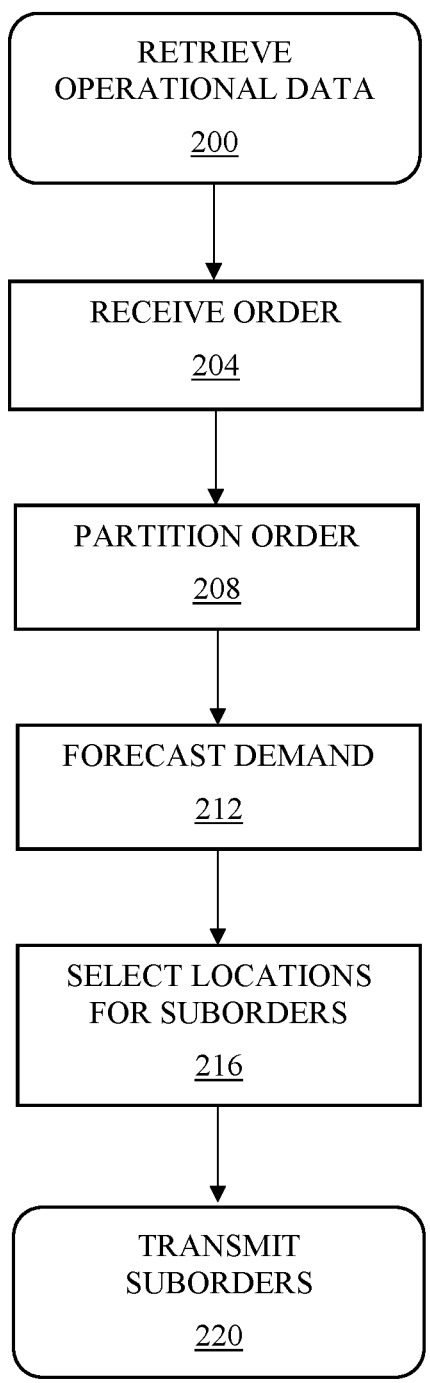
FIG. 2 presents a flowchart of a method for order fulfillment in accordance with one embodiment.

FIG. 2 presents a flowchart of a method for order fulfillment in accordance with one embodiment. The method commences with a central computing facility like a hub retrieving operational data concerning one or more stores from data repositories that may themselves be directly or indirectly connected to the stores (Step 200).

As discussed above, the retrieving step involves receiving and transmitting information concerning inventory that each store has on hand, daily sales reports, staffing records (such as the number of employees at the store), shipping records and shipping rate cards (including shipping cost and delay), return policies, business hours, and other operational data for each store, such as pick decline estimation, i.e., an estimate of the likelihood that a request for an item will be declined despite the presence of the item in inventory due to, e.g., the unavailability of a worker to complete the request in the desired timeframe. The information can be exchanged on a scheduled basis, ad hoc, as needed, or some combination of the foregoing in various embodiments.

A customer places an order, typically including an address and a deadline for delivery, for various goods with a retailer. The order may be received directly by a hub for processing, or it may be submitted online to another website, faxed to an order transcription and processing service, submitted by telephone, etc., before being delivered to a hub for processing (Step 204).

The order itself typically includes a plurality of items. The order is partitioned into one or more suborders (Step 208), with each suborder having at least one item. The partitioning step utilizes the previously-collected information from stores concerning their inventory on hand, etc., when splitting the order into suborders, such that each store ultimately receives a suborder for items that it has on hand in inventory.

Additionally, embodiments of the method use demand forecasting to better improve order splitting and suborder generation (Step 212). As discussed above, it is impractical for the facility that receives orders to have constant and instantaneous access to accurate inventory information for each retail store in its fulfillment network. The methods of the '613 application, incorporated by reference, allows for forecasting of the demand for each item in each store using the collected historical data for items and stores and predicting how that demand affects each store's inventory. The predictions of the current item inventory in each store can be used to better divide the order into suborders at the hub. The suborder assignment process can be used to, e.g., balance inventory across stores to ensure that they have sufficient goods on hand to meet their expected demands after fulfilling the assigned suborders.

Having forecasted demand information from the operational data on hand and using this information to forecast the current levels of item inventory in each store, the hub 100 selects for each suborder a retail location in the fulfillment network for fulfilling the suborder based on the operational data on hand as well as the forecasted demand for each item (Step 216) and transmits the suborder to the selected retail location for fulfillment (Step 220).

Figure 3:
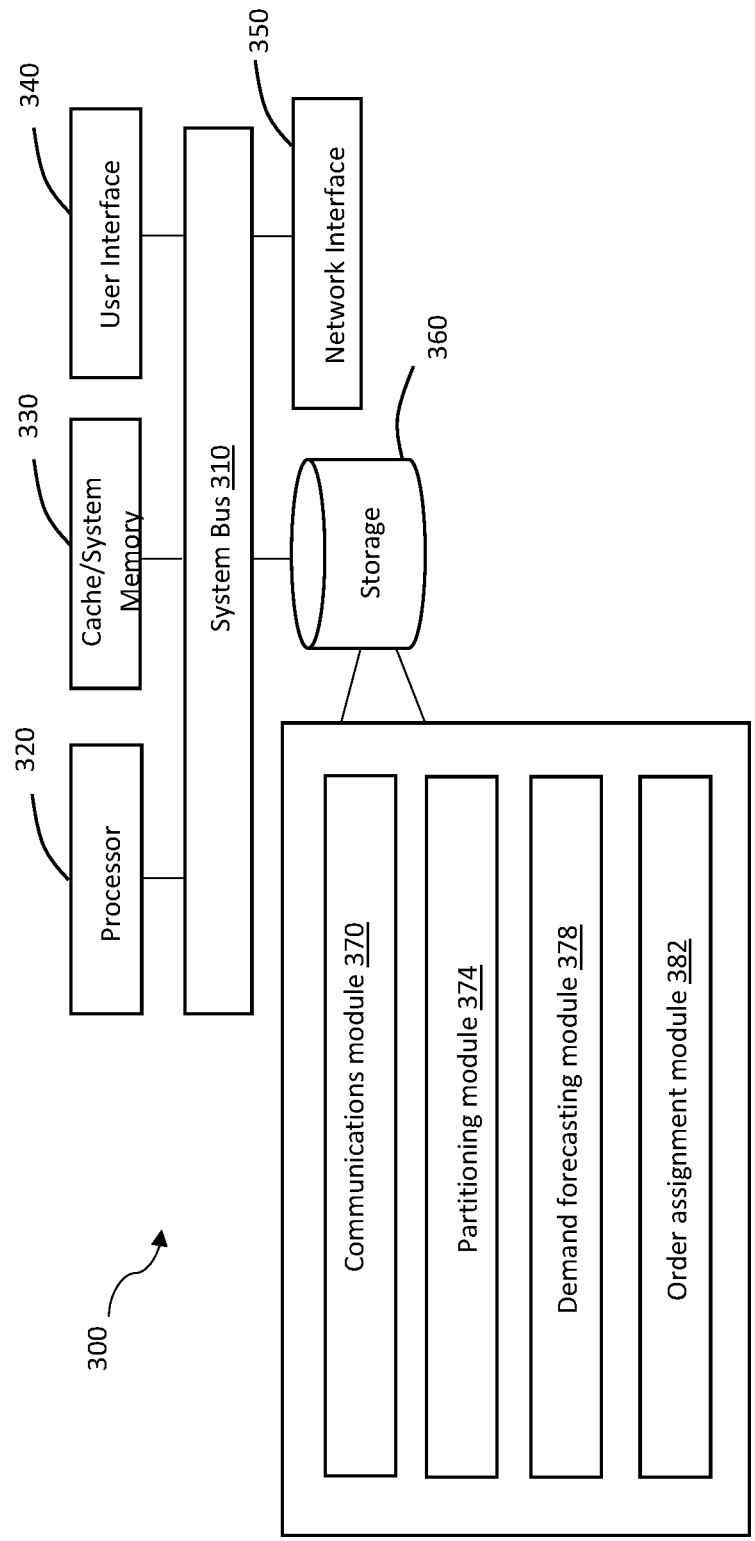
FIG. 3 depicts a system for order fulfillment in accordance with one embodiment.

FIG. 3 illustrates a system for order fulfillment in accordance with one embodiment. The system 300 may include a processor 320, memory 330, a user interface 340, a network interface 350, and storage 360, all interconnected via one or more system buses 310. It will be understood that FIG. 3 constitutes, in some respects, an abstraction and that the actual organization of the system 300 and the components thereof may differ from what is illustrated.

The processor 320 may be any hardware device capable of executing instructions stored on memory 330 and/or in storage 360, or otherwise any hardware device capable of processing data. As such, the processor 320 may include a microprocessor, field programmable gate array (FPGA), application-specific integrated circuit (ASIC), or other similar devices.

The memory 330 may include various transient memories such as, for example L1, L2, or L3 cache or system memory. As such, the memory 330 may include static random access memory (SRAM), dynamic RAM (DRAM), flash memory, read only memory (ROM), or other similar memory devices and configurations.

The user interface 340 may include one or more devices for enabling communication with system operators and other personnel. For example, the user interface 340 may include a display, a mouse, and a keyboard for receiving user commands. In some embodiments, the user interface 340 may include a command line interface or graphical user interface that may be presented to a remote terminal via the network interface 350. The user interface 340 may execute on a user device such as a PC, laptop, tablet, mobile device, or the like, and may enable a user to review records of order receipt and demand forecasting, for example.

The network interface 350 may include one or more devices for enabling communication with other remote devices to access one or more data sources comprising operational data for one or more retail stores in the fulfillment network. The network interface 350 may also allow for the transmission of suborders to one or more retail stores in the fulfillment network as discussed above. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon which the processor 320 may operate.

For example, the storage 360 may include a communications module 370, an order partitioning module 374, a demand forecasting module 378, and an order assignment module 382.

The communications module 370 may facilitate communications between the system 300 and third party systems and users. For example, the communications module 370 may communicate with stores, receiving and transmitting information concerning inventory that each store has on hand, daily sales reports, staffing records (such as the number of employees at the store), shipping records and shipping rate cards (including shipping cost and delay), return policies, business hours, and other operational data for each store, such as pick decline estimation, i.e., an estimate of the likelihood that a request for an item will be declined despite the presence of the item in inventory due to, e.g., the unavailability of a worker to complete the request in the desired timeframe. The information can be exchanged on a scheduled basis, ad hoc, as needed, or some combination of the foregoing. The communications module 370 may also allow for the receipt of customer orders and the transmission of partitioned suborders to one or more retail stores for fulfillment.

The partitioning module 374, working in tandem with the demand forecasting module 378, decomposes received orders into one or more suborders, with each suborder having at least one item. The partitioning module 374 uses previously collected operational information from the various stores in the fulfillment network to split the order into suborders, such that each store receives a suborder for the items that it has on hand in inventory. Moreover, in certain embodiments, the demand forecasting module 378 uses, among other information, the collected historical data for items and stores to better predict the current item inventory in each store. These predicted inventory levels may be used to affect how orders are split into one or more suborders for fulfillment. For example, if predicted demand values indicate that a particular store's inventory of items is insufficient to meet retail demand as well as a potential suborder, the suborders can be re-split to allocate the items at issue to different retail locations.

Having used the operational data and the forecasted demand information to partition an order into various suborders, the order assignment module 382 selects for each suborder a retail location in the fulfillment network for fulfilling the suborder based on the operational data on hand as well as the forecasted demand for each item and transmits the suborder to the selected retail location for fulfillment via the communications module 370.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system for fulfilling orders from a fulfillment network comprising a plurality of consumer-facing retail locations, the system comprising at least one computer comprising processing circuitry and memory, the memory storing instructions which, when executed by the processing circuitry, cause the processing circuitry to:
   retrieve, from a data source, operational data concerning a plurality of retail locations in the fulfillment network;
   receive an order comprising at least one item for delivery to an address;
   partition the order into at least one suborder comprising at least one item;
   forecast the demand for the at least one suborder item for a plurality of retail locations in the fulfillment network;
   select, for each suborder, a retail location in the fulfillment network for fulfilling the suborder based at least in part on the operational data and the forecasted demand; and
   transmit each suborder to the selected retail location for fulfillment,
   wherein the operational data comprises each and every one of the number of employees at the retail location, the shipping rate card of the retail location, the return policies of the retail location, the business hours of the retail location, and pick decline estimation for the retail location.

2. The system of claim 1, further comprising a data source comprising the operational data concerning a plurality of retail locations in the fulfillment network.

3. The system of claim 1, wherein the at least one computer is further configured to:
   calculate at least one delivery factor based on the address and at least one of the retail locations; and
   wherein selecting, for each suborder, a retail location for fulfilling the suborder is also based in part on the at least one delivery factor,
   wherein the at least one delivery factor is selected from the group consisting of delivery time and delivery cost.

4. The system of claim 3, wherein the selection of the retail location based on the forecasted demand weighs the forecasted demand for the at least one suborder item at the selected retail location against the weight of the operational data or the at least one delivery factor.

5. The system of claim 1, wherein forecasting the demand for the at least one suborder item for a plurality of retail locations comprises:
   retrieving historical demand data for the at least one suborder item for a retail location selected from the plurality of retail locations;
   computing an average of the retrieved historical demand data; and
   using the average as a forecast of the demand for the at least one suborder item for the selected retail location.

6. The system of claim 5, further comprising a data store containing historical demand data for the plurality of retail locations, the historical demand data selected from the group consisting of purchase data, inventory data, and web browsing transactions.

7. The system of claim 1, wherein the at least one computer is further configured to specify the shipment method in connection with the transmission of the suborder to the selected retail location.

8. The system of claim 1, wherein the at least one computer is further configured to:
   receive instructions from an operator prioritizing at least one factor; and
   wherein selecting, for each suborder, a retail location for fulfilling the suborder is also based at least in part on the at least one priority factor,
   wherein the at least one priority factor is selected from the group of forecasted in-store demand, delivery time, delivery cost, the number of suborders, and pick decline.

9. The system of claim 1, wherein the pick decline estimation for a retail location is derived from historical pick decline data for that location.

10. The system of claim 1, the memory further storing instructions which, when executed by the processing circuitry, cause the processing circuitry to eliminate at least some of the retail locations from the plurality of retail locations based on the ability of the retail location to meet a specified criterion prior to selecting a retail location for fulfilling the suborder.

11. A method for fulfilling orders from a fulfillment network comprising a plurality of consumer-facing retail locations, the method comprising:
   retrieving, from a data source by at least one computer, operational data concerning a plurality of retail locations in the fulfillment network;
   receiving, at the at least one computer, an order comprising at least one item for delivery to an address;
   partitioning, by the at least one computer, the order into at least one suborder comprising at least one item;

forecasting, by the at least one computer, the demand for the at least one suborder item for a plurality of retail locations in the fulfillment network;

selecting, for each suborder by the at least one computer, a retail location in the fulfillment network for fulfilling the suborder based at least in part on the operational data and the forecasted demand; and transmitting, by the at least one computer, each suborder to the selected retail location for fulfillment, wherein the operational data comprises each and every one of the number of employees at the retail location, the shipping rate card of the retail location, the return policies of the retail location, the business hours of the retail location, and pick decline estimation for the retail location.

12. The method of claim 11, further comprising:

calculating, by the at least one computer, at least one delivery factor based on the address and at least one of the retail locations; and wherein selecting, for each suborder, a retail location for fulfilling the suborder is also based in part on the at least one delivery factor, wherein the at least one delivery factor is selected from the group consisting of delivery time and delivery cost.

13. The method of claim 12, wherein the selection of the retail location based on the forecasted demand weighs the forecasted demand for the at least one suborder item at the selected retail location against the weight of the operational data or the at least one delivery factor.

14. The method of claim 11, wherein forecasting the demand for the at least one suborder item for a plurality of retail locations comprises:

retrieving, by the at least one computer, historical demand data for the at least one suborder item for a retail location selected from the plurality of retail locations;

computing, by the at least one computer, an average of the retrieved historical demand data; and using, by the at least one computer, the average as a forecast of the demand for the at least one suborder item for the selected retail location.

15. The method of claim 14, wherein the historical demand data is at least one of purchase data, inventory data, and web browsing transactions.

16. The method of claim 11, further comprising specifying, by the at least one computer, the shipment method in connection with the transmission of the suborder to the selected retail location.

17. The method of claim 11, wherein the pick decline estimation for a retail location is derived from historical pick decline data for that location.

18. The method of claim 11, further comprising eliminating, by the at least one computer, at least some of the retail locations from the plurality of retail locations based on the ability of the retail location to meet a specified criterion prior to selecting a retail location for fulfilling the suborder.

* * * * *